United States Patent
Cho et al.

(10) Patent No.: US 8,019,397 B2
(45) Date of Patent: Sep. 13, 2011

(54) MAGNETIC LEVITATION SLIDING STRUCTURE

(75) Inventors: Se-hoon Cho, Gwangju-si (KR); Jong-soon Kim, Gimhae-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 810 days.

(21) Appl. No.: 12/011,407

(22) Filed: Jan. 25, 2008

(65) Prior Publication Data

US 2008/0182634 A1 Jul. 31, 2008

(30) Foreign Application Priority Data

Jan. 26, 2007 (KR) .................. 10-2007-0008565

(51) Int. Cl.
*H04M 1/00* (2006.01)
(52) U.S. Cl. .................. 455/575.4; 455/90.3
(58) Field of Classification Search ............. 455/575.1
See application file for complete search history.

(56) References Cited

U.S. PATENT DOCUMENTS 6,980,840 B2 * 12/2005 Kim et al. .................. 455/575.4
2003/0061689 A1 * 4/2003 Fuhrman .................. 24/303

FOREIGN PATENT DOCUMENTS

KR 1020050037649 A 4/2005
KR 1020050089584 A 9/2005

OTHER PUBLICATIONS (WO/2004/12267) Driving Apparatus Using Magnetic Substance for Sliding Type Portable Wireless Terminal, Kim et al. Dec. 23, 2004.*
Kim et al., U.S. Appl. No. 11/888,541, filed Aug. 1, 2007.
Cho et al., U.S. Appl. No. 11/891,791, filed Aug. 13, 2007.
Cho, U.S. Appl. No. 11/891,985, filed Aug. 14, 2007.
Cho et al., U.S. Appl. No. 12/009,522, filed Jan. 18, 2008.

* cited by examiner

*Primary Examiner* — Lester Kincaid
*Assistant Examiner* — Andy Gu
(74) *Attorney, Agent, or Firm* — Drinker Biddle & Reath LLP (57) ABSTRACT

A magnetic levitation sliding structure including a first slide member, and a first magnetic portion which is disposed in the first slide member to extend along the lengthwise direction of the first slide member and has magnetic poles arranged perpendicular to the lengthwise direction of the first slide member with the lengthwise direction of the first slide member being an extending direction. The structure further includes a second slide member slidingly engaged with the first slide member, and a second magnetic portion which is disposed in the second slide member to extend parallel to the first magnetic portion and has magnetic poles with opposite magnetic polarity to those of the first magnetic portion in order for the first and second magnetic portions to repel each other.

16 Claims, 11 Drawing Sheets

MAGNETIC LEVITATION SLIDING STRUCTURE

CROSS-REFERENCE TO RELATED PATENT APPLICATION

This application claims the benefit of Korean Patent Application No. 10-2007-0008565, filed on Jan. 26, 2007, in the Korean Intellectual Property Office, the disclosure of which is incorporated herein in its entirety by reference.

BACKGROUND OF THE INVENTION

1. Field of the Invention

The present invention relates to a magnetic levitation sliding structure, and more particularly, to a magnetic levitation sliding structure, which can easily perform a sliding operation due to reduced friction between slide members and can have a reduced thickness.

2. Description of the Related Art

Recently, portable electronic devices such as mobile phones, cameras, portable multimedia players (PMPs), electronic dictionaries, electronic organizers, navigations, mini notebooks, and the like increasingly employ a sliding structure. The sliding structure enables such portable electronic devices to be easily manipulated and implemented.

Figure 1:
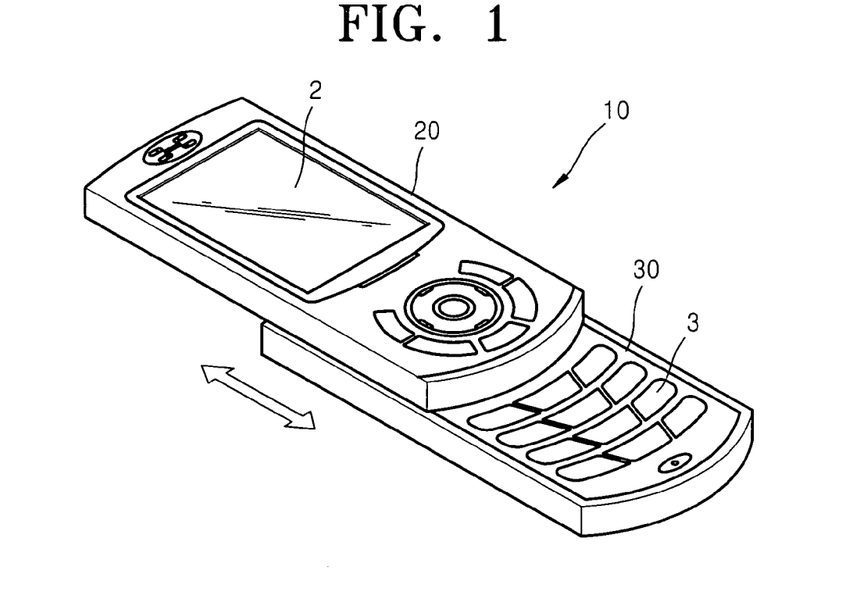
FIG. 1 is a perspective view of an example of a general mobile phone having a sliding structure.

FIG. 1 is a perspective view of an example of a general mobile phone 10 having a sliding structure. The general mobile phone 10 having the sliding structure comprises a receiver 20 including a screen 2 and a transmitter 30 including a manipulating unit 3 such as number keys. In order to speak into the general mobile phone 10 or transceive messages, the receiver 20 is slid up with respect to the transmitter 30. For a sliding operation, the general mobile phone 10 involves a conventional sliding structure 40 (see FIG. 2).

Operations of the conventional sliding structure 40 may be semi-automatically performed because a user also has to exert force for the sliding operation to be performed. In addition, when the conventional sliding structure 40 is fully closed or opened, the sliding operation completely depends on manipulation by the user, and this causes inconvenience to the user.

Generally, the transmitter 30 exposed due to the sliding operation of the sliding structure has too small of an area to include various function buttons in addition to the number keys. Therefore, additional buttons are generally disposed at the receiver 20, and also, as needed, the function buttons are disposed at side surfaces of the general mobile phone 10. As described above, the function buttons are not mainly disposed at a single area of the general mobile phone 10 and are separately disposed at several areas of the general mobile phone 10, and thus, button manipulation cannot be easily performed. In addition, in order to operate the function buttons, additional circuit substrates, signal lines for connecting the buttons, flexible printed circuit boards, and the like have to be provided.

Figure 2:
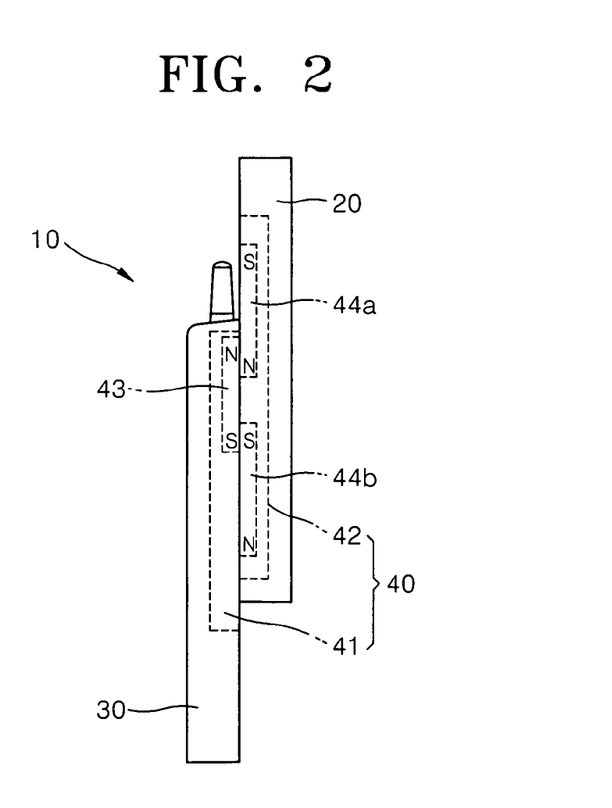
FIG. 2 is a side elevation view of a conventional sliding structure.

FIG. 2 is a side elevation view of the general mobile phone 10 illustrated in FIG. 1 to explain the conventional sliding structure 40 disclosed in Korean Patent Application Publication No. 10-2005-0037649. The conventional sliding structure 40 includes sliders 41 and 42 at the transmitter 30 and the receiver 20, respectively, and the sliders 41 and 42 include magnets 43, 44a, and 44b. The magnets 43, 44a, and 44b are disposed to exert magnetic forces on each other, so that the sliders 41 and 42 can be relatively moved by operations of the magnets 43, 44a, and 44b.

In the conventional sliding structure 40, friction between the sliders 41 and 42 occurs, thus hindering the sliding operation. More specifically, the receiver 20 slidingly moves with respect to the transmitter 30, and in the state illustrated in FIG. 2, the magnetic north pole of magnet 44a of the receiver 20 and the magnetic south pole of the magnet 44b of the receiver 20 contact the magnetic north pole of the magnet 43 of the transmitter 30 and the magnetic south pole of magnet 43 of the transmitter 30, respectively. As described above, like magnetic poles of the magnets 43, 44a, and 44b contact each other and thus repel each other, so that the sliding operation to slide up the receiver 20 with respect to the transmitter 30 cannot be easily performed. Accordingly, it is inconvenient for the user to manipulate the conventional sliding structure 40. In addition, when the receiver 20 is at an initial closed position against the transmitter 30, opposite magnetic poles of the magnets 44a and 43 contact each other and attract each other, and thus, a large force has to be exerted to slide up the receiver 20, which causes inconvenience for the user.

Figure 3:
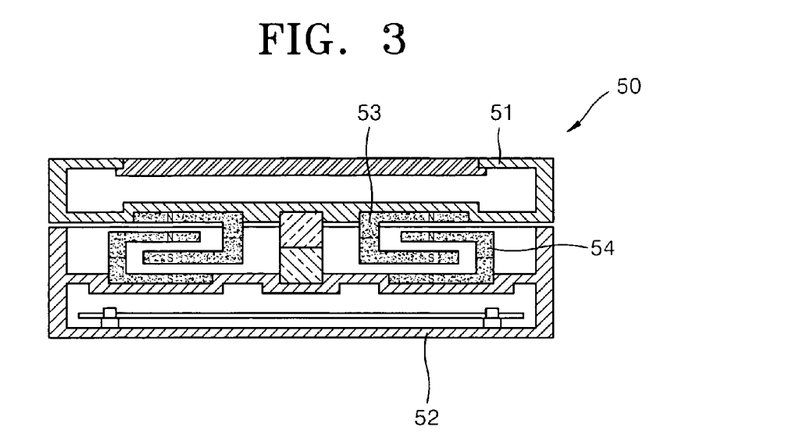
FIG. 3 is a cross-sectional view of another conventional sliding structure.

FIG. 3 is a cross-sectional view of another conventional sliding structure 50 disclosed in Korean Patent Application Publication No. 10-2005-0089584. The conventional sliding structure 50 illustrated in FIG. 3 includes a first slide member 51 and a second slide member 52 that can slide with respect to the first slide member 51. The first slide member 51 includes a first magnetic member 53 having a shape of a horseshoe magnet, and the second slide member 52 includes a second magnetic member 54 having the shape of the horseshoe magnet. The first and second magnetic members 53 and 54 are disposed in alternate positions to facilitate a sliding operation.

When the conventional sliding structure 50 having the aforementioned structure performs the sliding operation, the north poles of the first and second magnetic members 53 and 54 repel each other, and the south poles of the first and second magnetic members 53 and 54 also repel each other. In addition, at the same time, the magnetic south pole of the first magnetic member 53 and the magnetic north pole of the second magnetic member 54 attract each other. As described above, due to the attraction, the sliding operation cannot be easily performed, since an additional manipulation force is needed.

In addition, for sliding movement to occur, an interval between the first and second magnetic members 53 and 54 has to be guaranteed. However, due to external impacts or vibrations, the first and second magnetic members 53 and 54 may contact with each other and, due to this contact, friction may be increased during the sliding operation. In this case, a surface contact occurs between the first and second magnetic members 53 and 54, so that large friction is generated, and the sliding operation cannot be easily performed. In addition, at bending portions of the first and second magnetic members 53 and 54 where the first and second magnetic members 53 and 54 are not in alternate positions, repulsion decreases, so that the sliding operation cannot be easily performed.

Also, the two magnetic members 53 and 54 having the shape of the horseshoe magnet disposed in alternate positions occupy a large space, so that the thickness of the entire sliding structure increases. In addition, an operation of disposing the magnetic members 53 and 54 having the shape of the horseshoe magnet in alternate positions cannot be easily performed.

SUMMARY OF THE INVENTION

The present invention provides a magnetic levitation sliding structure that can easily perform a sliding operation due to reduced friction between sliders. The present invention also provides a magnetic levitation sliding structure that can have a small thickness.

Accordingly, an embodiment of the present invention provides a magnetic levitation sliding structure including a first magnet portion and a second magnet portion exerting magnetic forces on an external surface of the first magnet portion so as to easily perform a sliding operation. In this example, the magnetic levitation sliding structure includes a first slide member, and a first magnetic portion which is disposed in the first slide member to extend along the lengthwise direction of the first slide member and has magnetic poles arranged perpendicular to the lengthwise direction of the first slide member, such that the lengthwise direction of the first slide member is an extending direction. The magnetic levitation sliding structure further includes a second slide member slidingly engaged with the first slide member, and a second magnetic portion which is disposed in the second slide member to extend parallel or substantially parallel to the first magnetic portion and has magnetic poles with opposite magnetic polarity to those of the first magnetic portion in order for the first and second magnetic portions to repel each other.

In addition, the second magnet portion may be formed to have a shape corresponding to that of the side surface of the first magnetic portion so as to correspondingly enclose at least a portion of the side surface of the first magnetic portion that is partially disposed in the first slide member, thereby being slidingly engaged with the first magnetic portion. Also, a cross-section of the first magnetic portion may have a circular shape, and an internal surface of the second magnetic portion may have a semicylinder shape corresponding to the side surface of the first magnetic portion. Furthermore, the cross-section of the first magnet portion may have an oval shape. In addition, a radius of curvature of the side surface of the first magnet portion may be smaller than that of the internal surface of the second magnet portion, and the cross-section of the first magnet portion may have a polygonal shape. A magnetic force line shield may be disposed at one or more portions of the side surface of the first magnet portion.

In addition, the magnetic levitation sliding structure may further include a rail for slidingly engaging the first and second slide members. The rail may include a protrusion protruding from the first slide member to the second slide member, and a groove grooved in the second slide member along the extending direction in order for the protrusion to slide in the groove. A magnetic force line shield may be correspondingly disposed in one or more portions of a side surface of the second magnetic portion.

Furthermore, a guide protruding toward the second slide member and extending in the sliding direction of the first slide member may be disposed at a side surface of the first slide member, and the first magnet portion may be provided to the guide. The side surface of the first magnet portion may be buried in the guide, and the other side surface of the first magnet portion may be exposed to an external surface of the guide to extend along the guide. Accommodating portions may be formed at both sides of the second slide member, and a side surface of the second magnetic portion may be correspondingly buried in the accommodating portion and the other surface of the second magnetic portion may be exposed to the guide. Also, the length of the accommodating portion may be larger than that of the guide.

In addition, the first magnetic portion may include a plurality of magnets, and the second magnetic portion may include a plurality of magnets. The side surface of the first magnet portion may be buried in the guide, and the other side surface of the first magnet portion protrudes from an internal surface of the guide to extend along the guide.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Hereinafter, structures and operations of a magnetic levitation sliding structure according to exemplary embodiments of the present invention will be described in detail with reference to the attached drawings.

Figure 4:
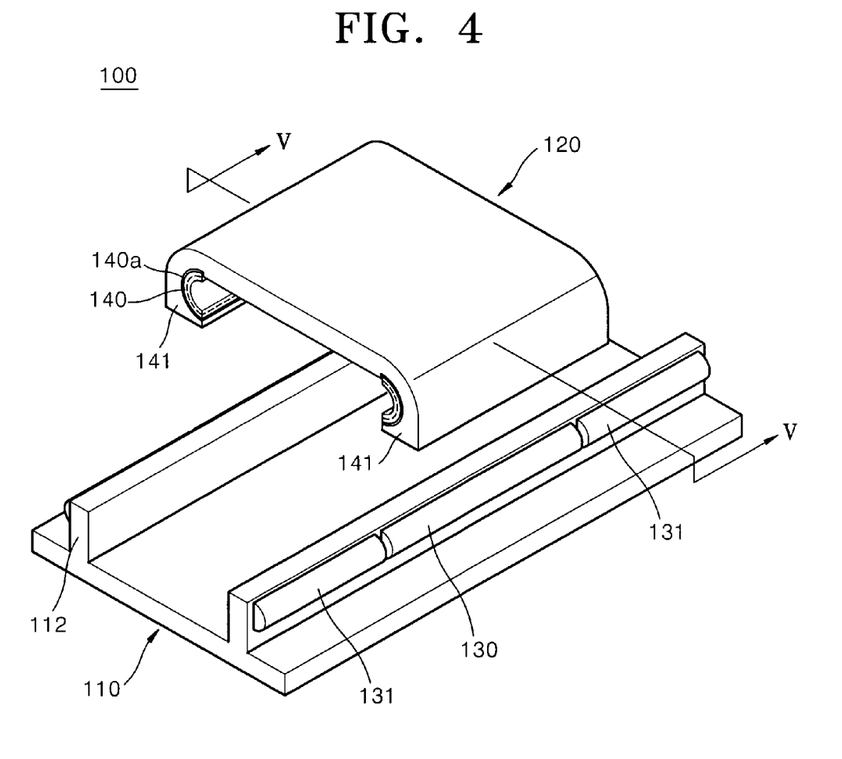
FIG. 4 is an exploded perspective view of an example of a magnetic levitation sliding structure according to an embodiment of the present invention.
Figure 5:
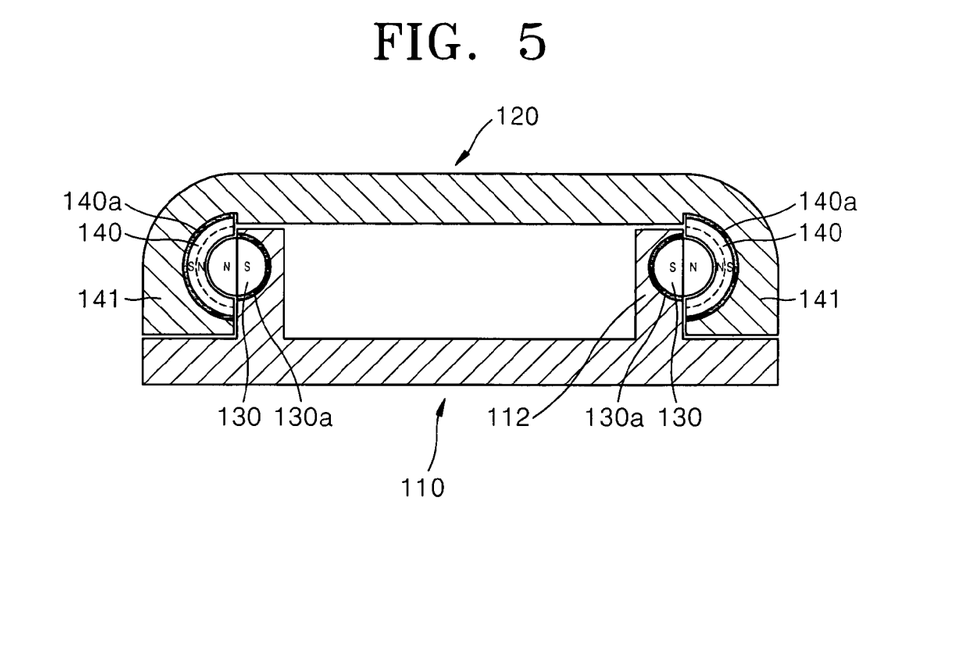
FIG. 5 is a cross-sectional view of the magnetic levitation sliding structure illustrated in FIG. 4 taken along line V-V.

FIG. 4 is an exploded perspective view of a magnetic levitation sliding structure 100 according to an embodiment of the present invention. FIG. 5 is a cross-sectional view of the magnetic levitation sliding structure 100 illustrated in FIG. 4 taken along line V-V.

The magnetic levitation sliding structure 100 illustrated in FIGS. 4 and 5 according to this embodiment includes a first slide member 110, a first magnetic portion 130, a second slide member 120, and a second magnetic portion 140. The first slide member 110 in this example is made of a non-magnetic material such as aluminum alloy or plastic and is connected to or supports a second slide member 120 of the magnetic levitation sliding structure 100. The first magnetic portion 130 is disposed partially in the first slide member 110. A cross-section of the first magnetic portion 130 has a circular shape, and the first magnetic portion 130 extends in a sliding direction, that is, a direction of the length of the first slide member 110 and is disposed at an external side of the first slide member 110. The first magnetic portion 130 has such a shape and a position so that the first and second slide members 110 and 120 can perform a mutual sliding operation.

Referring to FIGS. 4 and 5, the first slide member 110 includes guides 112 that protrude from an upper surface of the first slide member 110 and extend in the sliding direction slide member 110. The first magnetic portion 130 is disposed in an external surface of the guide 112 of the first slide member 110. A part of a side surface of the first magnetic portion 130 is buried in the guide 112, and the other part of the side surface of the first magnetic portion 130 protrudes outward from the guide 112. As described above, since the cross-section of the first magnetic portion 130 has a circular or substantially circular shape, the first magnetic portion 130 protruding outward from the guide 112 has a cross section of a semicircular or substantially semicircular shape.

The guide 112 may be provided with guide portions 131, having the same shape as the first magnetic portion 130, near both end portions of the first magnetic portion 130 and in the sliding direction. The guide portion 131 does not exert magnetic forces as the first magnetic portion 130 and performs a function of guiding the second slide member 120 to slide with respect to the first slide member 110.

Figure 6:
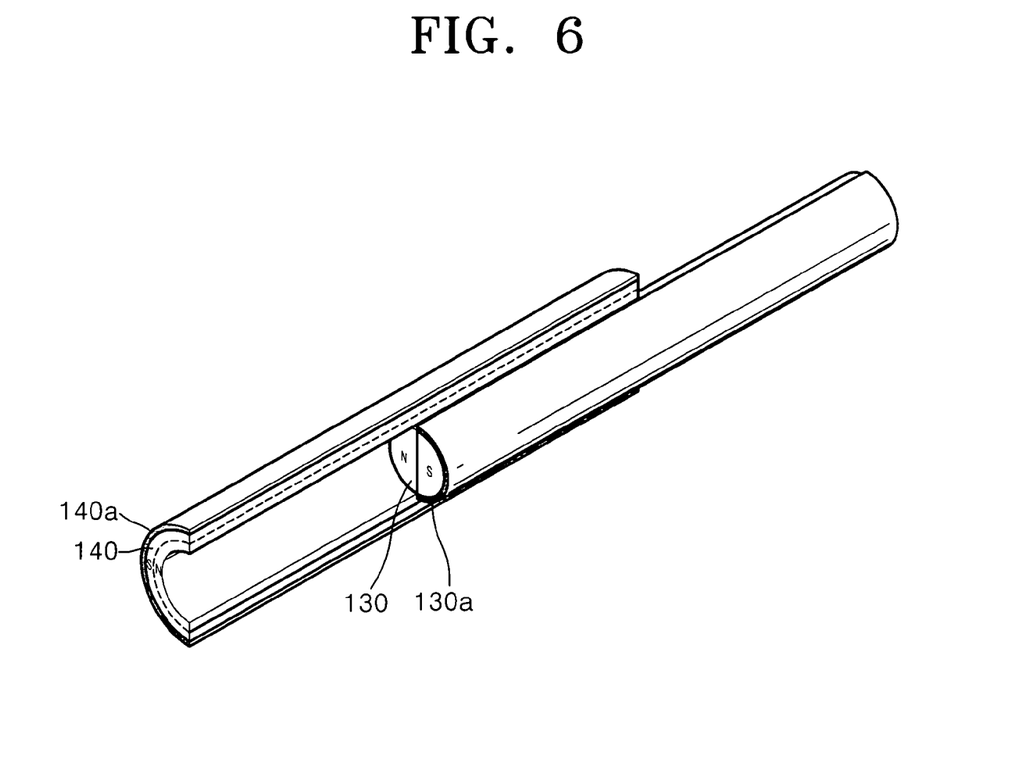
FIG. 6 is a partial perspective view schematically illustrating magnetic portions of the magnetic levitation sliding structure illustrated in FIG. 4.

FIG. 6 is a partial perspective view schematically illustrating the magnetic portions of the magnetic levitation sliding structure 100 illustrated in FIG. 4. Magnetic poles of the first magnetic portion 130 may be disposed in a direction perpendicular to sliding direction, facing a side surface of the first slide member 110. The magnetic north pole of the first magnetic portion 130 illustrated in FIGS. 5 and 6 is externally disposed from the first slide member 110, and the magnetic south pole thereof is internally disposed in first slide member 110.

The second slide member 120 is slidingly engaged with the first slide member 110 and may be made of a non-magnetic material such as aluminum alloy and plastic as the first slide member 110. A structure of slidingly engaging the first and second slide members 110 and 120 can be modified in various manners, and thus the present invention is not limited to this embodiment.

In order to slidingly engage the first and second slide members 110 and 120, the first and second magnetic portions 130 and 140 are slidingly engaged with each other. The second magnetic portions 140 are disposed in accommodating portions 141 formed in both sides of the second slide member 120 to face the first magnetic portions 130 of the first slide member 110. The accommodating portions 141 protrude from both sides of the second slide member 120 to partially face the external surface of the guides 112 and extend in the sliding direction. A side surface of the second magnetic portion 140 is buried in the accommodating portion 141, and the other side surface of the second magnetic portion 140 is exposed to the guide 112.

An internal surface of the second magnetic portion 140 has a shape corresponding to that of the other part of the side surface of the first magnetic portion 130, which protrudes from the guide 112. According to the current embodiment, the second magnetic portion 140 is a magnet having a semi-circular or substantially semi-circular cross-section or having a semi-cylinder shape, and extends in the extending direction. Therefore, the internal surface of the second magnetic portion 140 correspondingly encloses the other part of the side surface of the first magnetic portion 130, which protrudes from the guide 112, and the internal surface of the second magnetic portion 140 has a magnetic pole polarity opposite to that of the other part of the side surface of the first magnetic portion 130. Therefore, the second magnetic portion 140 and the first magnetic portion 130 repel each other. In FIG. 5, the other part of the side surface of the first magnetic portion 130 has a magnetic north polarity, and the internal surface of the second magnetic portion 140 has a magnetic north polarity, and thus, the first and second portions 130 and 140 repel each other. On the contrary, when the other part of the side surface of the first magnetic portion 130 has a magnetic south polarity, the internal surface of the second magnetic portion 140 has a magnetic south polarity. Although not shown in the figure, protective layers may be formed between the other part of the side surface and the internal surface of the first and the second magnetic portions 130 and 140, which face each other, in order to protect such surfaces from friction.

A magnetic force line shield 130a is disposed between the part of the side surface of the first magnetic portion 130 buried in the guide 112 and an the external surface of the guide 112. In another embodiment, a magnetic force line shield may be additionally disposed on a side surface of the first magnetic portion 130, which forms circular cross-section. The magnetic force line shield 130a is disposed initially on the external surface of the guide 112 instead of being directly attached to the part of the surface of the first magnetic portion 130. In this case, once the magnetic force line shield 130a is properly disposed on the external surface of the guide 112, the first magnetic portion 130 is disposed in the guide 112.

The magnetic force line shield 130a has a function of shielding other components, such as a circuit substrate, from magnetic forces, wherein such other components engage with the magnetic levitation sliding structure 100. The magnetic force line shield 130a is made of a ferromagnetic material to block magnetic force lines generated from the first magnetic portion 130. As the ferromagnetic material, AD-MU alloys or other suitable materials may be used. In this embodiment, the magnetic force line shield 130a is made of a ferromagnetic material. However, the present invention is not limited to this arrangement, and thus, the magnetic force line shield 130a may be made of a non-magnetic material.

A magnetic force line shield 140a is also provided between the side surface of the second magnetic portion 140 and an internal surface of the accommodating portion 141, which faces the side surface of the second magnetic portion 140. Optionally, the magnetic force line shield 140a is not directly attached to the surface of the second magnetic portion 140, but is initially disposed on the internal surface of the accommodating portion 141. In this case, once the magnetic force line shield 140a is disposed on the internal surface of the accommodating portion 141, the second magnetic portion 140 is disposed in the second slide member 120.

When the second slide member 120 is slidingly engaged with the first slide member 110 with the second magnetic portion 140 interposed therebetween, the first magnetic portion 130 is inserted into the second magnetic portion 140, so that the first and second magnetic portions 130 and 140 exert magnetic forces on each other. By arranging the magnetic poles of the first and second magnetic portions 130 and 140 as described above, the first and second magnetic portions 130 and 140 repel each other, so that the sliding operation between the first and second slide members 110 and 120 can be easily performed.

The first and second magnetic portions 130 and 140 always repel each other. Therefore, friction which occurs in the sliding operation of the second slide member 120, having the second magnetic portion 140, on the first slide member 110, having the first magnetic portion 130, can be minimized. This is because the second slide member 120 levitates on the first slide member 110 due to the repulsion. A degree of repulsion is associated with the magnitude of the exerted magnetic forces, and more specifically, with the sizes and properties of applied magnets.

In addition, the cross-section of the first magnetic portion 130 has the circular shape that corresponds to the internal shape of the second magnetic portion 140, so that if the first magnetic portion 130 is moved in vertical, and horizontal directions with respect to the second magnetic portion 140 and the first and second magnetic portions 130 and 140 contact each other, due to an external impact, such contact that occurs between the first and second magnetic portions 130 and 140 is a linear contact that less affects the magnetic levitation sliding structure 100. In a conventional magnetic levitation sliding structure, a high friction force due to a contact area occurs. However, according to this embodiment, a friction force that occurs between the first and second magnetic portions 130 and 140 can be minimized.

In the magnetic levitation sliding structure 100, one of the first and second slide members 110 and 120 can be mounted on a main body of an electronic device, such as a mobile phone, a camera, and a portable multimedia player (PMP), in which electronic components such as a main chipset, a battery, and the like are included, and the other one of the first and second slide members 110 and 120 can be mounted on a sub body having a relatively simple structure, so as to perform the sliding operation. The magnetic levitation sliding structure 100, according to the current embodiment, has advantages in terms of space and costs once applied to the portable electronic device.

In addition, the main body of the electronic device may be manufactured with one of the first or second slide members 110 and 120, and the sub body may be manufactured with the other of the first and second slide members 110 and 120. Accordingly, a volume of the electronic device can be reduced, and a small-sized electronic device capable of performing the sliding operation can be implemented.

Figure 7:
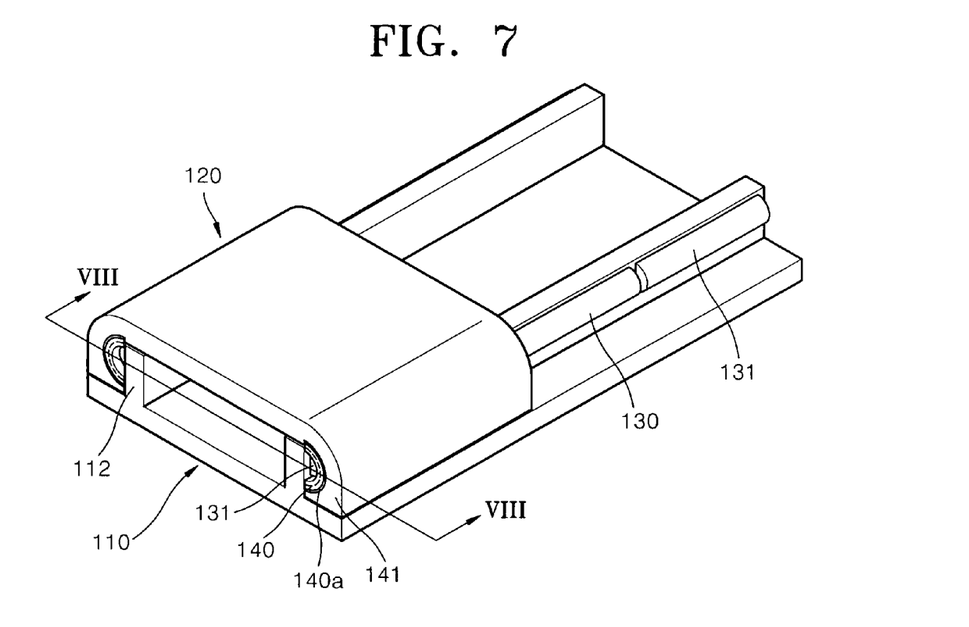
FIG. 7 is a perspective view of the closed magnetic levitation sliding structure illustrated in FIG. 4.
Figure 8:
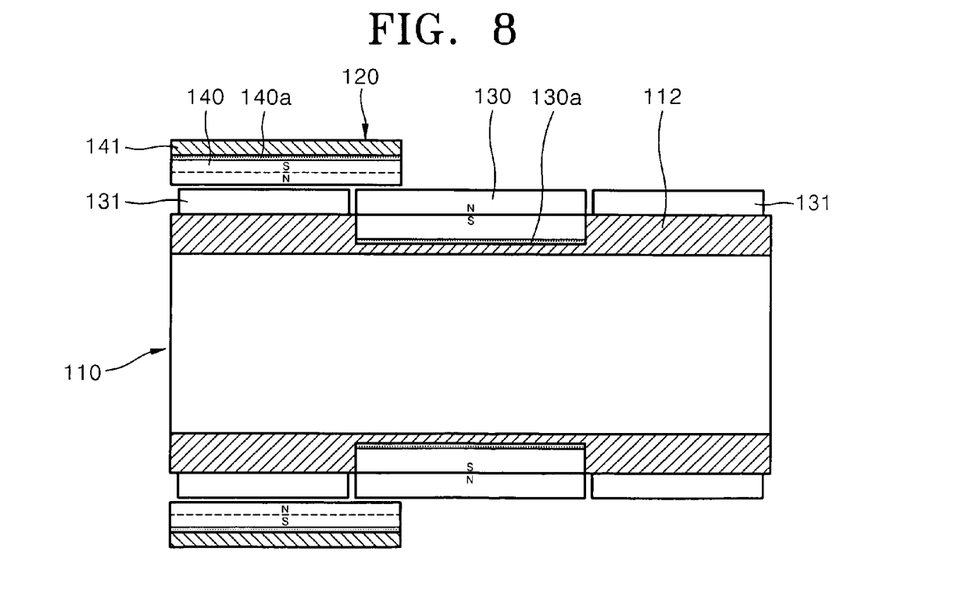
FIG. 8 is a cross-sectional view of the magnetic levitation sliding structure illustrated in FIG. 7 taken along line VIII-VIII.

FIG. 7 is a perspective view of the closed magnetic levitation sliding structure 100 illustrated in FIG. 4. FIG. 8 is a cross-sectional view of the magnetic levitation sliding structure 100 illustrated in FIG. 7 taken along line VIII-VIII.

FIGS. 7 and 8 illustrate a state where the second slide member 120 is at an initial position. The second slide member 120 is slid to a side of the first slide member 110 to be closed or be in the initial position.

A portion of the first magnetic portion 130 overlaps with a portion of the second magnetic portion 140. In this case, due to the arrangement of the magnetic poles of the first and second magnetic portions 130 and 140, the first and second magnetic portions 130 and 140 repel each other. Therefore, the second slide member 120 can be stably disposed at the initial position due to the repulsion between the first and second magnetic portions 130 and 140. In addition, due to the repulsion, the second slide member 120 levitates on the first slide member 110, so that friction that occurs in the sliding operation can be minimized.

When a user pushes the second slide member 120 up from the initial position, the degree of overlapping the first and second magnetic portions 130 and 140 increases as compared to the initial position. Accordingly, the magnitude of the repulsion between the first and second magnetic portions 130 and 140 increases.

Therefore, even if the user pushes the second slide member 120 up abruptly, the abrupt movement of the second slide member 120 less affects the magnetic levitation sliding structure 100 due to the repulsion between the first and second magnetic portions 130 and 140, and thus, an impact exerted on the magnetic levitation sliding structure 100 less affects the magnetic levitation sliding structure 100. In addition, due to the repulsion, since the second slide member 120 levitates on the first slide member 110, friction that occurs in the sliding operation can be reduced.

Figure 9:
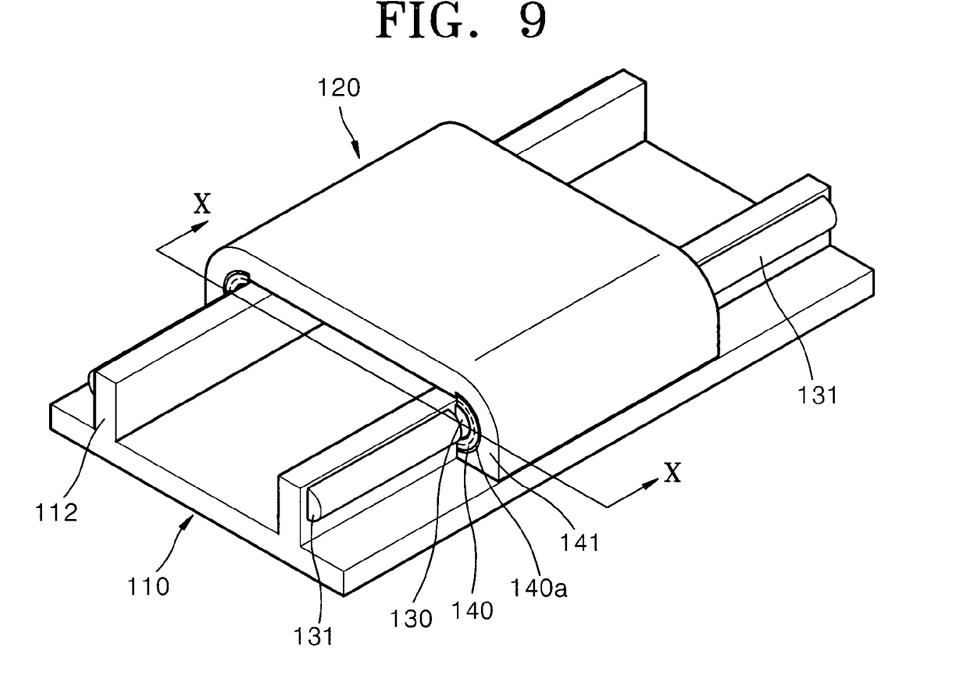
FIG. 9 is a perspective view of the magnetic levitation sliding structure illustrated in FIG. 4.
Figure 10:
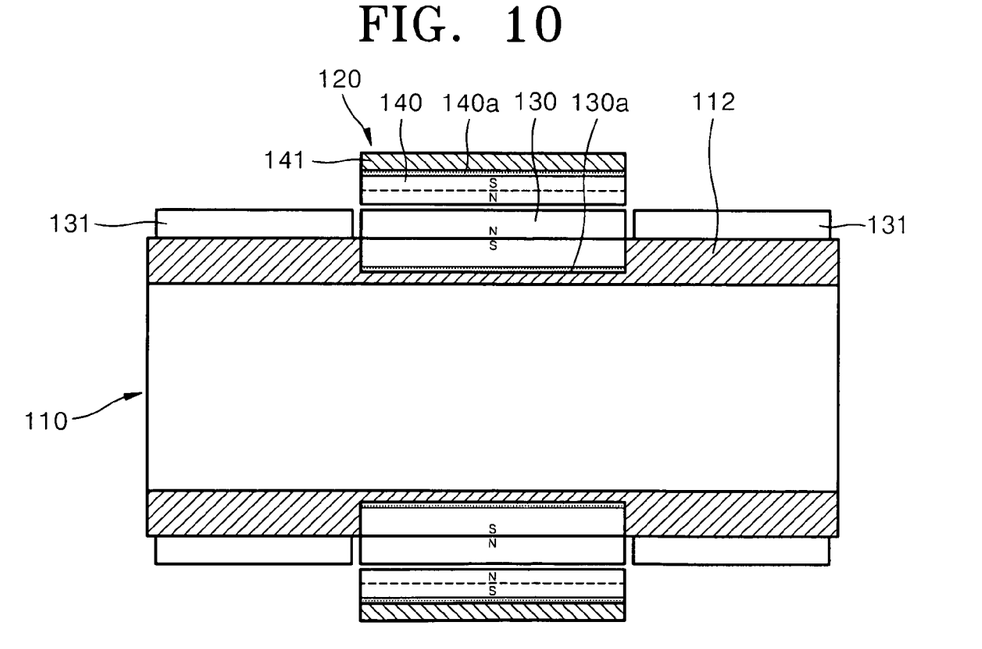
FIG. 10 is a cross-sectional view of the magnetic levitation sliding structure illustrated in FIG. 9 taken along line X-X.

When the user continuously pushes the second slide member 120 up, the magnetic levitation sliding member 100 is in a state as illustrated in FIGS. 9 and 10. FIG. 9 is a perspective view of the magnetic levitation sliding structure illustrated 100 in FIG. 4. FIG. 10 is a cross-sectional view of the magnetic levitation sliding structure 100 illustrated in FIG. 9 taken along line X-X.

FIGS. 9 and 10 illustrate a case where the second slide member 120 is disposed in a center position. In this position, the first magnetic portion 130 correspondingly overlaps with the second magnetic portion 140, and thus, the first and second magnetic portions 130 and 140 repel each other.

When the user continuously pushes the second slide member 120 up from the state illustrated in FIGS. 9 and 10, due to the repulsion between the first and second magnetic portions 130 and 140, the user can push the second slide member 120 up with a small force. In this case, the user does not need to exert a large force to push the second slide member 120 up from the center position, and thus, avoid an excessive impact on the magnetic levitation sliding structure 100 due to a pushing force of the user. In addition, the second slide member 120 levitates on the first slide member 110 due to the repulsion, so that friction that occurs in the sliding operation can be reduced. When the user continuously pushes the second slide member 120 up from the center position until the magnetic levitation sliding structure 100 arrives to a state illustrated in FIGS. 11 and 12.

Figure 11:
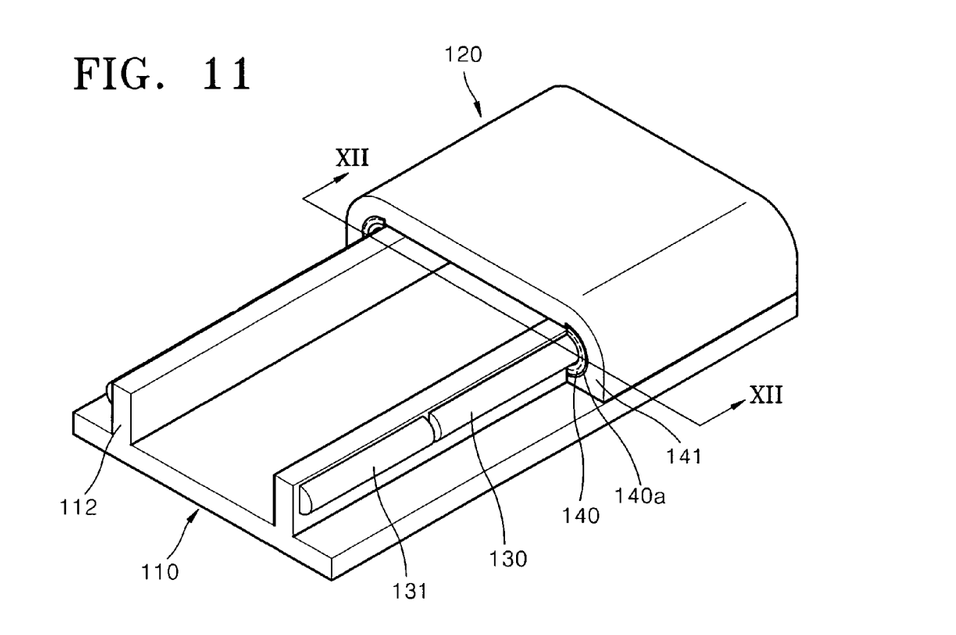
FIG. 11 is a perspective view of the opened magnetic levitation sliding structure illustrated in FIG. 4.
Figure 12:
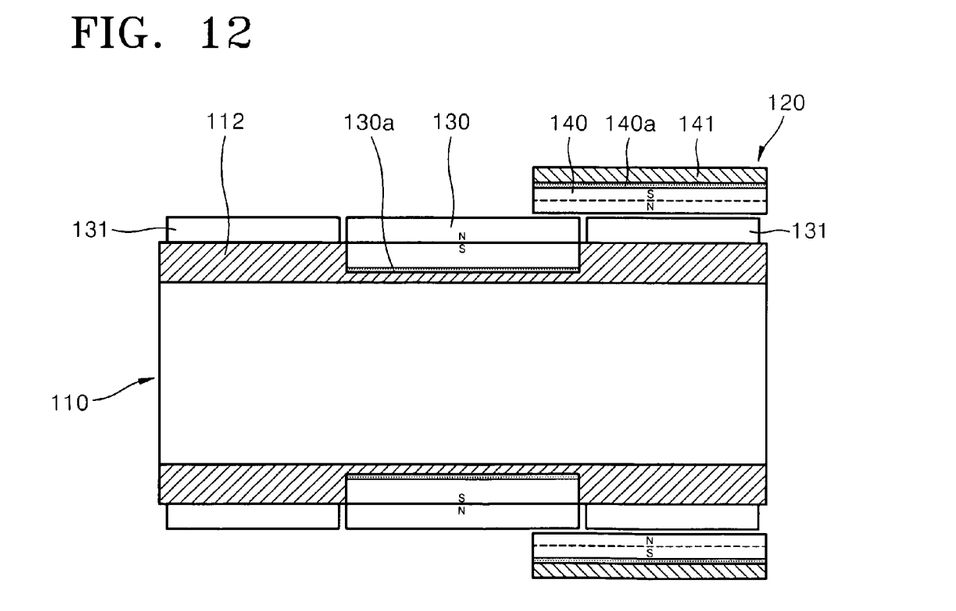
FIG. 12 is a cross-sectional view of the magnetic levitation sliding structure illustrated in FIG. 11 taken along line XII-XII.

FIG. 11 is a perspective view of the opened magnetic levitation sliding structure illustrated in FIG. 4. FIG. 12 is a cross-sectional view of the magnetic levitation sliding structure 100 illustrated in FIG. 11 taken along line XII-XII.

In the magnetic levitation sliding structure 100 illustrated in FIGS. 11 and 12, due to the arrangement of the magnetic poles of the first and second magnetic portions 130 and 140, the first and second magnetic portions 130 and 140 repel each other. Therefore, due to the repulsion, the second slide member 120 can be stably maintained at a final position as shown in FIG. 11. In addition, since the second slide member 120 continuously levitates on the first slide member 110 due to the repulsion, a friction force that occurs when the user performs a sliding-down operation is reduced.

Figure 13:
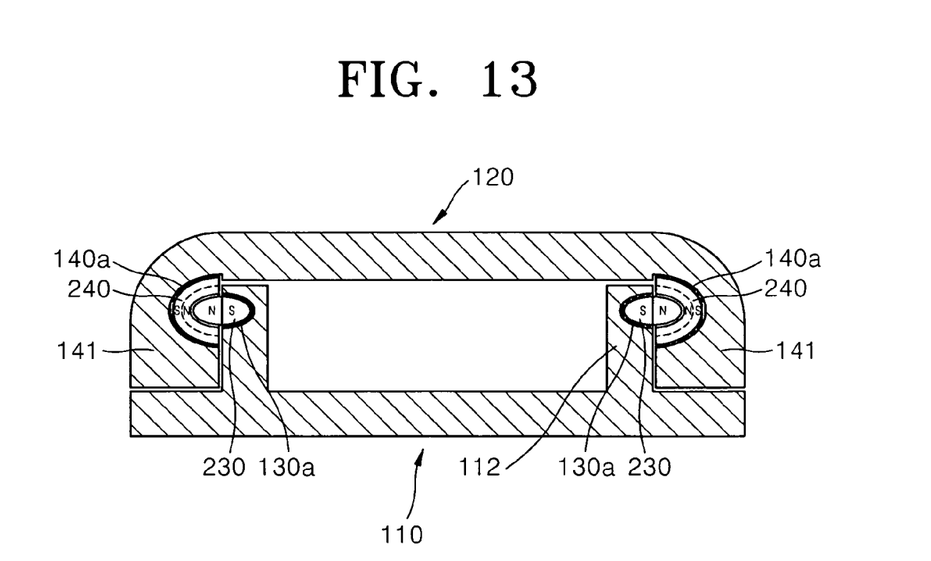
FIG. 13 is a cross-sectional view of an example of a magnetic levitation sliding structure according to another embodiment of the present invention.

FIG. 13 is a cross-sectional view of a magnetic levitation sliding structure according to another embodiment of the present invention. The magnetic levitation sliding structure illustrated in FIG. 13 is a modification of that of the aforementioned embodiment in that a first magnetic portion 230 has an oval or substantially oval cross-section. Therefore, a second magnetic portion 240 has a corresponding oval or substantially oval cross-section to that of the first magnetic portion 230, in order to correspondingly enclose a side surface of the first magnetic portion 230, which protrudes from the guide 112.

According to this embodiment, the degree of an overlapping area between the first and second magnetic portions 230 and 240 increases as compared to that of the aforementioned embodiment, and thus, a stronger repulsion occurs between the first and second magnetic portions 230 and 240. When the first magnetic portions 230 is moved relative to the second magnetic portion 240 in vertical and horizontal directions due to an external impact and friction occurs therebetween, a line contact occurs between the first and second magnetic portions 240 and such line contact less affects the magnetic levitation sliding structure. In the conventional magnetic levitation sliding structure, a high friction force due to a surface contact occurs. However, according to the current embodiment, the external impact transmitted to the first and second magnetic portions 230 and 240 can be effectively distributed.

When the cross-section of a first magnetic portion has a circular or substantially circular, or an oval or substantially oval shape, a radius of curvature of the first magnetic portion may be smaller than that of an internal cross-section of the second magnetic portion. In this embodiment, when friction occurs due to an external impact or vibrations in the sliding operation, linear contact occurs on a contact area between the first and second magnetic portions 230 and 240, so that resistance due to the friction that occurs in the sliding operation can be minimized.

Figure 14:
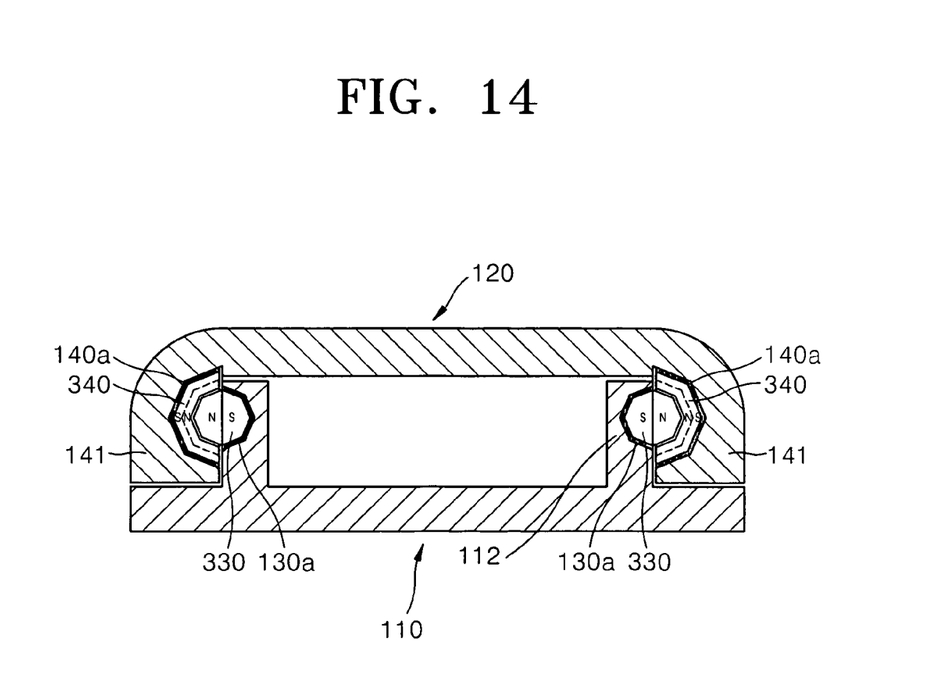
FIG. 14 is a cross-sectional view of an example of a magnetic levitation sliding structure according to a further embodiment of the present invention.

FIG. 14 is a cross-sectional view of a magnetic levitation sliding structure according to another embodiment of the present invention. The magnetic levitation sliding structure illustrated in FIG. 14 is a modification of that of the aforementioned embodiment in that a first magnetic portion 330 has an octagonal cross-section, and accordingly, a second magnetic portion 340 has a cross-section having a corresponding octagonal or substantially octagonal shape to correspondingly enclose the octagonal or substantially octagonal cross-section of the first magnetic portion 330.

In the current embodiment, the degree of an overlapping area between the first and second magnetic portions 330 and 340 increases as compared to the aforementioned embodiment, and thus, a stronger repulsion force occurs between the first and second magnetic portion 330 and 340. In this case, the second magnetic portion 340 is manufactured to correspond to a side surface of the first magnetic portion 330.

When the first and second magnetic portions 330 and 340 are moved in vertical and horizontal directions due to an external impact and friction occurs therebetween, a line contact occurs between the first and second magnetic portions 240 instead of a surface contact therebetween to less affect the magnetic levitation sliding structure. Accordingly, friction that may occur between the first and second magnetic portions 330 and 340 can be minimized.

In the aforementioned embodiments, the cross-sections of the first and second magnetic portions have a circular, oval, or polygonal shape, however the present invention is not limited to such arrangements.

Figure 15:
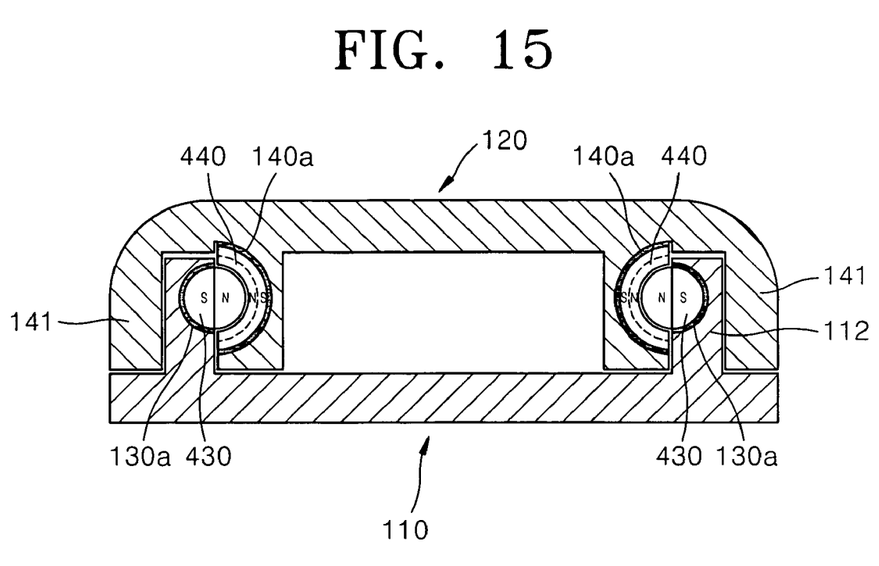
FIG. 15 is a cross-sectional view of a magnetic levitation sliding structure according to another embodiment of the present invention.

FIG. 15 is a cross-sectional view of a magnetic levitation sliding structure according to another embodiment of the present invention. According to the aforementioned embodiments, the first magnetic portion is disposed to protrude from the guide. However, according to the embodiment illustrated in FIG. 15, a part of a side surface of a first magnetic portion 430 is disposed in a corresponding internal surface of the guide 112, and the other part of the side surface of the first magnetic portion 430 is disposed protruding from the guide 112 to correspond to an internal surface of a second magnetic portion 440. In this arrangement, the part and other part of the side surface of the first magnetic portion 430 have opposite magnetic pole polarities and the other part of side surface of the first magnetic portion 430 has an opposite magnetic pole polarity to that of the corresponding internal surface of the second magnetic portion 440. Magnetic poles of the first magnetic portion 430 are disposed perpendicular to the sliding direction of a first slide member 110 to face the side surface of the first slide member 110.

The part of the first magnet portion 430 and a side surface of the second magnetic portion 440 are shaped to respectively correspond to shapes of the internal surface of guide 112 of the first slide member 110 and an internal surface of the accommodation portion 141 of a second slide member 120 in order to perform the sliding operation due to magnetic levitation. However, the shapes and positions of the first and second magnetic portions 430 and 440 are not limited to those in this embodiment.

Figure 16:
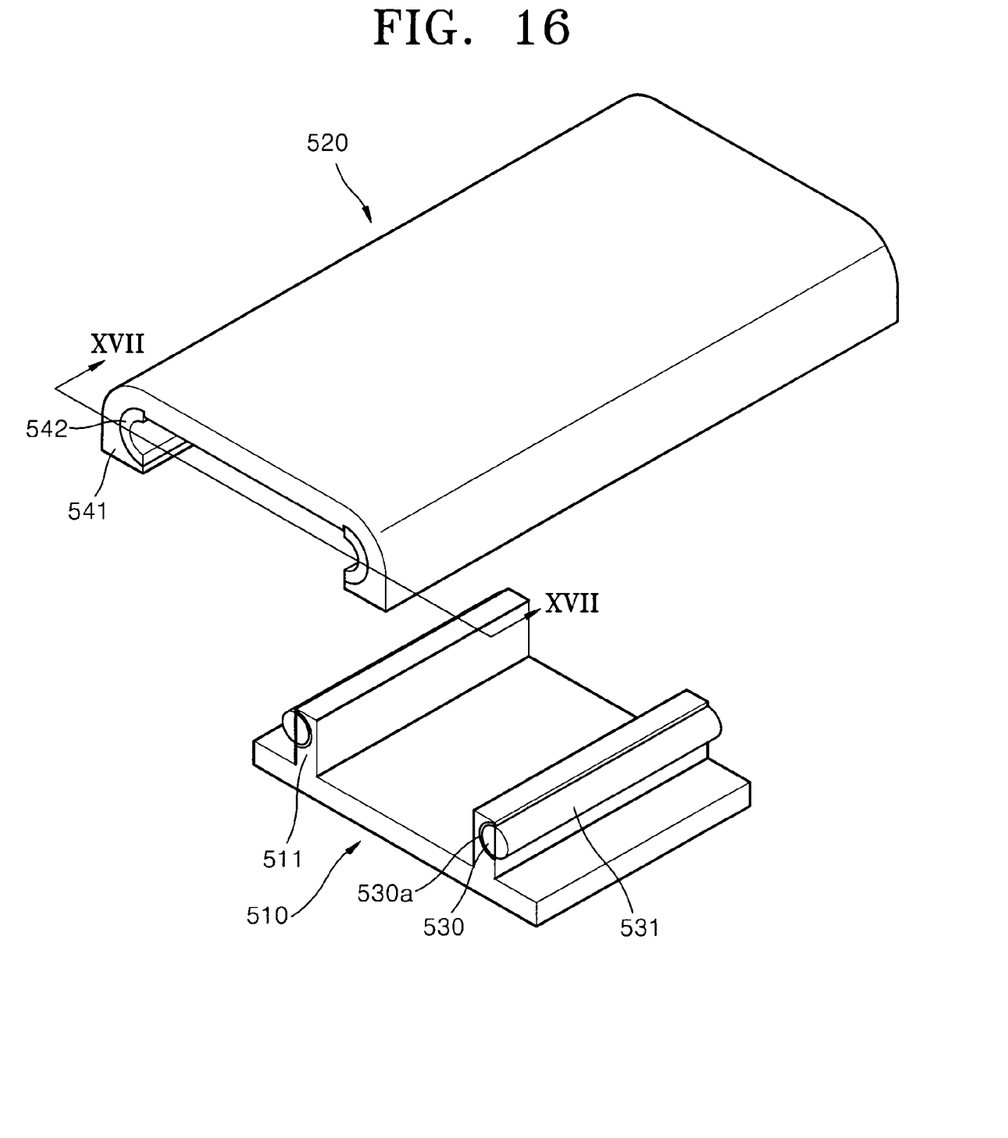
FIG. 16 is an exploded perspective view of a magnetic levitation sliding structure according to still another embodiment of the present invention.
Figure 17:
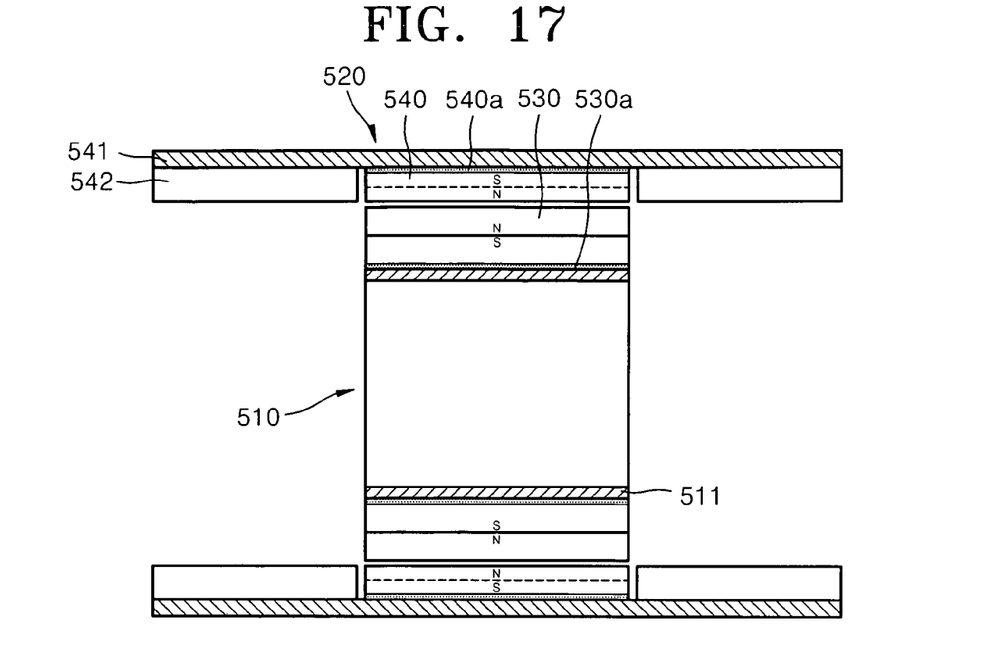
FIG. 17 is a cross-sectional view of the magnetic levitation sliding structure illustrated in FIG. 16 taken along line XVII-XVII.

FIG. 16 is an exploded perspective view of a magnetic levitation sliding structure according to another embodiment of the present invention. FIG. 17 is a cross-sectional view of the magnetic levitation sliding structure illustrated in FIG. 16 taken along line XVII-XVII.

Structures and arrangements of first and second slide members 510 and 520 of the magnetic levitation sliding structure illustrated in FIGS. 16 and 17 are respectively similar to the first and second slide members 110 and 120 illustrated in FIG. 4. However, the length of an accommodating portion 541 of the second slide member 520 is longer than that of a guide 511 of the first slide member 510.

The second slide member 520 is slidingly engaged with the first slide member 510. The accommodating portion 541 protrudes from both sides of the second slide member 540 and extends in the sliding direction of the second slide member 540 and, in a center portion of the second slide member 540, a magnetic force line shield 540a and a second magnetic portion 540 are correspondingly disposed in a semi-circular internal surface of the accommodating portion 541. In addition, the accommodating portion 541 is provided with guide portions 542 on both end portions of the second magnetic portion 540. A semi-circular or substantially semi-circular internal surface of the guide portions 542 has a shape corresponding to that of a part of a side surface of the first magnetic portion 530 so as to guide a sliding movement of the first magnetic portion 530 with respect to the second magnetic portion 540, and a semi-circular or substantially semi-circular internal surface of the second magnetic portion 540 has a shape corresponding to that of the part of the side surface of the first magnetic portion 530, wherein the part of the side surface of the first magnetic portion 530 has a magnetic pole polarity that is the same as the magnetic pole polarity of the corresponding semi-circular or substantially semi-circular internal surface of the second magnetic portion 540.

The first magnetic portion 530 can be disposed partially in the guide 511 of the first slide member 510, and partially protruding from the guide 511 of the first slide member 510. A magnetic force line shield 530a is correspondingly disposed between the first magnetic portion 530 and the guide 511. The first magnetic portion 530 is inserted between the second magnetic portion 540 and the guide portion 542 to slide therebetween, so that the first and second slide members 510 and 520 may perform the sliding operation with magnetic levitation due to magnetic forces.

Figure 18:
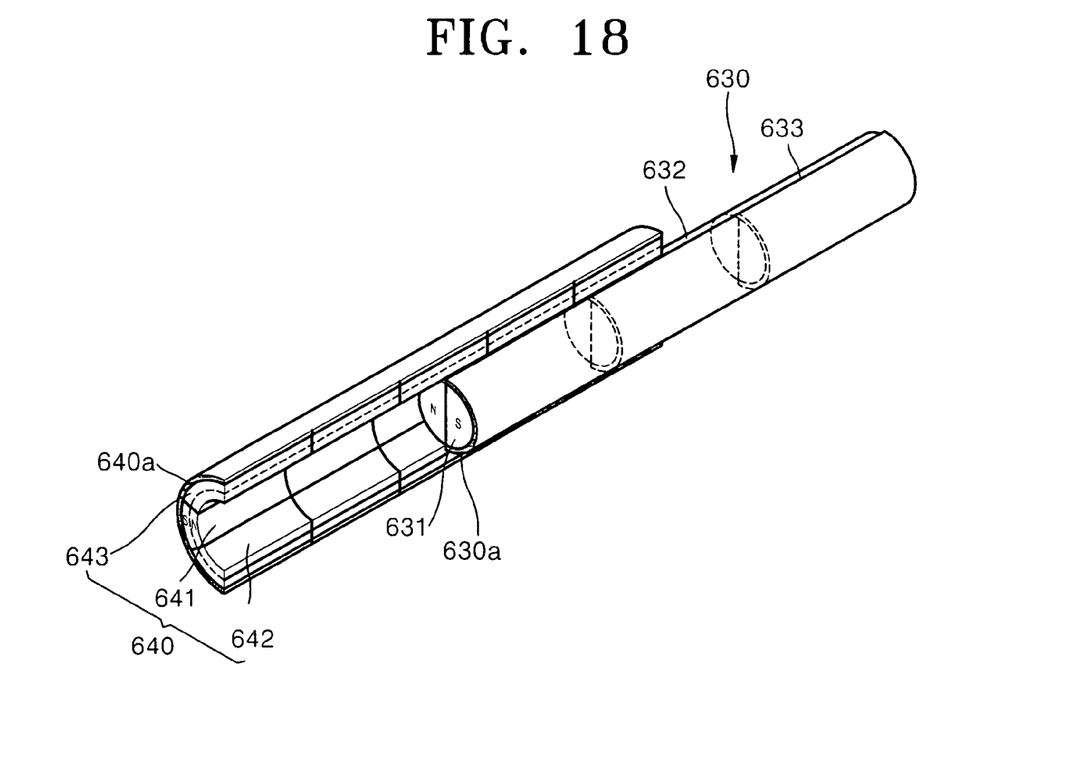
FIG. 18 is a partial perspective view schematically illustrating arrangement of magnetic portions of a magnetic levitation sliding structure, according to a further embodiment of the present invention.

FIG. 18 is a partial perspective view schematically illustrating arrangement of magnetic portions of a magnetic levitation sliding structure, according to another embodiment of the present invention. According to the embodiment illustrated in FIG. 18, first and second magnetic portions 630 and 640 may include a plurality of magnets. In this case, the arrangement directions of the magnetic poles of the magnets of the first and second magnetic portions 630 and 640 are the same as those of the first and second magnetic portions each of which includes a single magnet. Magnetic force line shields 630a and 640a are disposed correspondingly enclosing external surfaces of the first and second magnetic portions 630 and 640, respectively.

The first magnetic portion 630 may include a plurality of small cylinder-shaped magnets 631, 632, and 633 respectively arranged to form the cylinder shaped first magnetic portion 640 by extending along the sliding direction. Optionally, the magnets 631, 632, and 633 may be disposed at predetermined intervals along the sliding direction. When the magnets 631, 632, and 633 are disposed at predetermined intervals along the sliding direction, the areas on which magnetic forces between the first and second magnetic portions 630 and 640 are exerted can be determined in various manners, so that opening and closing operations of an electric device such as the mobile phone can be conveniently performed.

The second magnetic portion 640 may include a plurality of arc-shaped or substantially arc-shaped magnets 641, 642, and 643 of which are respectively arranged to form the semicircular or substantially semi-circular shaped second magnetic portion 640, and extend in the sliding direction and have magnetic poles disposed internally and externally. The magnets 641, 642, and 643 may be disposed to correspondingly enclose an external side of the first magnet 630, which has a magnetic polarity opposite to that of the internal magnetic poles of the facing arc-shaped magnets 641, 642, and 643, thus, due to this opposite magnetic pole polarity, the first and second magnetic portions 630 and 640 repel each other. Although not shown in the figure, the second magnetic portion 0 may include a plurality of arc-shaped magnets that are stacked a radial direction, such that the arc-shaped magnets are respectively arranged to form the second magnetic portion 640 and extend along the sliding direction. Therefore, the second magnet portion is manufactured by assembling the magnets which have a shape similar to a plane, so that the second magnet portion can be easily manufactured as compared with the second magnet portion having the semi-cylinder or substantially semi-circular shape.

In FIG. 18, the magnets 641, 642, and 643 of the second magnetic portion 640 are respectively arranged to form the semi-circular or substantially semi-circular shaped second magnetic portion 640, and extend in the sliding direction. However, this arrangement can be changed so that the magnets 641, 642, and 643 are disposed at predetermined intervals along the sliding direction. Accordingly, a region between the first and second magnetic portions 630 and 640 on which the magnetic force is exerted is divided into several ones, so that the sliding operation of the magnetic levitation sliding structure can be easily performed.

Figure 19:
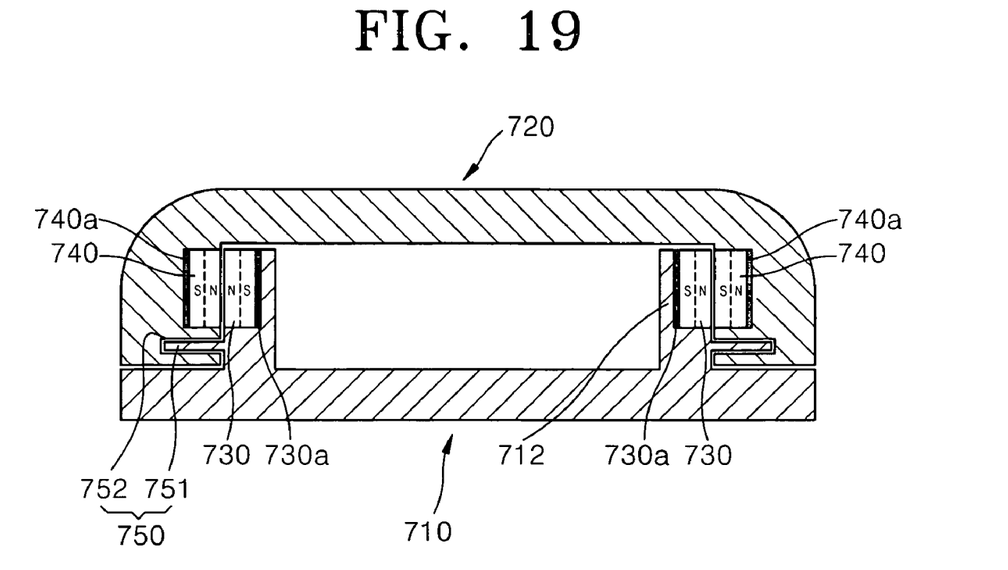
FIG. 19 is a cross-sectional view of a magnetic levitation sliding structure according to yet another embodiment of the present invention.

FIG. 19 is a cross-sectional view of a magnetic levitation sliding structure according to another embodiment of the present invention. The magnetic levitation sliding structure illustrated in FIG. 19 includes a first slide member 710, a second slide member 720, first magnetic portions 730, second magnetic portions 740, and rails 750. The first and second slide members 710 and 720 are slidingly engaged with each other due to the rail 750. The rail 750 includes a protrusion 751 protruding from the first slide member 710 and a groove 752 grooved in the second slide member 720 in the extending direction. By inserting the protrusion 751 into the groove 752, the first and second slide members 710 and 720 can be slidingly engaged with each other.

The protrusion 751 protrudes from the first slide member 710 to the second slide member 720. The groove 752 of the second slide member 720 is grooved along the sliding direction in order for the protrusion 751 to slide in the groove 752. The first magnetic portion 730, extending along the sliding direction, is disposed on a guide 712 of the first slide member 710. Magnetic poles of the first magnetic portion 730 are arranged to be perpendicular to the extending direction of the first magnetic portion 730.

The second magnetic portion 740 is disposed in the second slide member 720. The second magnet portion 740 extends parallel or substantially parallel to the first magnetic portion 730 and has magnetic poles arranged such that facing magnetic poles of the first magnetic portion 730 and the second magnetic portion 740 are of the same magnetic pole polarity, and thus, the first magnetic portion 730 and the second magnetic portion 740 repel each other.

A magnetic force line shield 730a, for shielding other components against magnetic forces, is disposed between a side surface of the first magnetic portion 730 and a side surface of the guide 712, wherein the side surface of the guide 712 is opposite to the side surface of the first magnetic portion 730. A magnetic force line shield 740a is disposed between a side surface of the first magnetic portion 740 and a side surface of an accommodation portion of the second slide member 720, wherein the side surface of the first magnetic portion 740 is opposite to side surface of the accommodation portion of the second slide member 720, which protrudes from the second slide member and correspondingly accommodates the second magnetic portion 740 that has a square or rectangular shape, or a substantially square or rectangular shape.

As illustrated in FIG. 19, when the first and second slide members 710 and 720 are slidingly engaged by the rails 750, the first and second magnetic portions 730 and 740 can exert magnetic forces on each other. Due to the arrangement of the magnetic poles of the first and second magnetic portions 730 and 740 as described above, the first and second magnetic portions 730 and 740 repel each other, so that a sliding operation of the first and second slide members 710 and 720 can be easily performed. In addition, since the protrusion 751 is inserted into the groove 752, separation of the first and second slide members 710 and 720 due to the magnetic forces exerted between the first and second magnetic portions 730 and 740 can be prevented.

As described above, in the magnetic levitation sliding structure according to the embodiments of the present invention, the slide members move relative to each other based on magnetic levitation due to the magnetic forces exerted between the first and second magnetic portions, so that the sliding operation can be easily performed. In addition, when an external impact is exerted on the magnetic levitation sliding structure, and, due to this, vibrations occur between the first and second slide members, the first and second magnetic portions have a line contact, so that friction forces are reduced, and the sliding operation can be easily performed. Also, the second magnetic portion correspondingly encloses at least a portion of the external surface of the first magnetic portion so as to exert magnetic forces on the first magnetic portion, and thus, the thickness of the magnetic levitation sliding structure can be decreased.

While the present invention has been particularly shown and described with reference to exemplary embodiments thereof, it will be understood by one skilled in the art that various changes in form and details may be made therein without departing from the spirit and scope of the present invention as defined by the appended claims.

What is claimed is:

1. A magnetic levitation sliding structure comprising:
a first slide member;
a first magnetic portion which is disposed in the first slide member to extend along the lengthwise direction of the first slide member and has magnetic poles arranged perpendicular to the lengthwise direction of the first slide member, wherein the lengthwise direction of the first slide member is an extending direction;
a second slide member slidingly engaged with the first slide member; and
a second magnetic portion which is disposed in the second slide member to extend substantially parallel to the first magnetic portion and has magnetic poles with opposite magnetic polarity to those of the first magnetic portion in order for the first and second magnetic portions to repel each other, wherein the second magnetic portion is formed to have a shape corresponding to that of a side surface of the first magnetic portion so as to correspondingly enclose at least a portion of the side surface of the first magnetic portion that is partially disposed in the first slide member, thereby being slidingly engaged with the first magnetic portion, and wherein a cross-section of the first magnetic portion has a substantially circular shape, and wherein an internal surface of the second magnetic portion has a substantially semi-cylinder shape corresponding to the side surface of the first magnetic portion.

2. The magnetic levitation sliding structure of claim 1, wherein a radius of curvature of the side surface of the first magnetic portion is smaller than that of the internal surface of the second magnetic portion.

3. The magnetic levitation sliding structure of claim 1, further comprising a rail for slidingly engaging the first and second slide members.

4. The magnetic levitation sliding structure of claim 3, wherein the rail comprises:
a protrusion protruding from the first slide member to the second slide member; and
a groove grooved in the second slide member along the extending direction in order for the protrusion to slide in the groove.

5. The magnetic levitation sliding structure of claim 1, wherein a magnetic force line shield is correspondingly disposed on one or more portions of the side surface of the first magnetic portion.

6. The magnetic levitation sliding structure of claim 1, wherein a magnetic force line shield is correspondingly disposed in one or more portions of a side surface of the second magnetic portion.

7. The magnetic levitation sliding structure of claim 1, wherein a guide protruding toward the second slide member and extending in the sliding direction of the first slide member is disposed at a side surface of the first slide member, and the first magnet portion is provided to the guide.

8. The magnetic levitation sliding structure of claim 7, wherein the side surface of the first magnet portion is disposed in the guide, and the other side surface of the first magnet portion is exposed to an external surface of the guide to extend along the guide.

9. The magnetic levitation sliding structure of claim 8,
wherein accommodating portions are formed at both sides of the second slide member, and
wherein a side surface of the second magnetic portion is correspondingly disposed in the accommodating portion, and the other surface of the second magnetic portion is exposed to the guide.

10. The magnetic levitation sliding structure of claim 9, wherein the length of the accommodating portion is larger than that of the guide.

11. The magnetic levitation sliding structure of claim 1, wherein the first magnetic portion includes a plurality of magnets.

12. The magnetic levitation sliding structure of claim 1, wherein the second magnetic portion includes a plurality of magnets.

13. The magnetic levitation sliding structure of claim 1, wherein the first magnetic portion faces outwardly of the first slide member and the second magnetic portion faces inwardly of the second slide member.

14. The magnetic levitation sliding structure of claim 1, wherein the first magnetic portion faces inwardly of the first slide member and the second magnetic portion faces outwardly of the second slide member.

15. The magnetic levitation sliding structure of claim 4, wherein the protrusion protrudes outwardly from the first slide member and the groove faces inwardly of the second slide member.

16. The magnetic levitation sliding structure of claim 1, wherein the first and second magnetic portions are employed in respective portions of a portable electronic device.

* * * * *